(12) United States Patent
Okabe et al.

(10) Patent No.: US 12,060,514 B2
(45) Date of Patent: *Aug. 13, 2024

(54) LIQUID CRYSTAL COMPOSITION AND ELEMENT USED FOR PHASE CONTROL OF ELECTROMAGNETIC WAVE SIGNAL

(71) Applicants: JNC CORPORATION, Tokyo (JP); JNC PETROCHEMICAL CORPORATION, Tokyo (JP)

(72) Inventors: Eiji Okabe, Chiba (JP); Takanori Mori, Chiba (JP); Yuko Katano, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 99 days.

This patent is subject to a terminal disclaimer.

(21) Appl. No.: 17/373,802

(22) Filed: Jul. 13, 2021

(65) Prior Publication Data

US 2022/0119710 A1 Apr. 21, 2022

(30) Foreign Application Priority Data

Oct. 21, 2020 (JP) ................................ 2020-176832

(51) Int. Cl.
    C09K 19/12     (2006.01)
    C09K 19/18     (2006.01)
    C09K 19/34     (2006.01)

(52) U.S. Cl.
    CPC .............. *C09K 19/12* (2013.01); *C09K 19/18* (2013.01); *C09K 19/345* (2013.01); *C09K 2019/122* (2013.01); *C09K 2019/123* (2013.01); *C09K 2019/181* (2013.01); *C09K 2019/186* (2013.01); *C09K 2019/188* (2013.01)

(58) Field of Classification Search
    CPC ....................................................... C09K 19/18
    See application file for complete search history.

(56) References Cited

U.S. PATENT DOCUMENTS

| 2012/0205583 A1 | 8/2012 | Montenegro et al. |
| 2016/0040066 A1 | 2/2016 | Wittek et al. |
| 2017/0130129 A1 | 5/2017 | Wittek et al. |
| 2018/0239213 A1 | 8/2018 | Akselrod et al. |

(Continued)

FOREIGN PATENT DOCUMENTS

| CN | 103254910 A | * | 8/2013 |
| JP | 2004285085 |   | 10/2004 |

(Continued)

OTHER PUBLICATIONS

CN 103254910 A1 Machine Translation (Year: 2024).*
Hiroshi Moritake, "EKISHO—Microwave / millimeter wave phase control device (1st) Microwave characteristics of liquid crystal" journal of the Japanese Liquid Crystal Society, vol. 23, Jan. 2019, pp. 51-55, with partial English translation thereof.
Kentaro Sakudo, "Solid Physical Property—Lattice Vibration and Dielectric," published by Shokabo Co., Ltd., Mar. 1995, pp. 58-79, with partial English translation thereof.

*Primary Examiner* — Chanceity N Robinson
(74) *Attorney, Agent, or Firm* — JCIPRNET

(57) ABSTRACT

A material used in an element for phase control of an electromagnetic wave signal having a frequency of 1 GHz to 10 THz. A liquid crystal composition containing at least one compound selected from a group of compounds represented by Formula (1), at least one compound selected from a group of compounds represented by Formula (2) and at least one compound selected from a group of compounds represented by Formula (3). In Formulae (1) to (3), $R^1$, $R^{21}$, $R^{22}$, $R^{31}$, and $R^{32}$ may be alkyls having 1 to 12 carbon atoms; a ring $A^1$ may be 1,4-phenylene; $Z^{11}$, $Z^{13}$, $Z^{21}$, $Z^{23}$, $Z^{31}$, and $Z^{33}$ may be single bonds; $Z^{12}$, $Z^{22}$, and $Z^{32}$ may be —C≡C— or —C≡C—C≡C—; $L^{13}$ to $L^{16}$, $L^{21}$ to $L^{23}$, and $L^{31}$ to $L^{36}$ may be hydrogen or fluorine; $Y^{11}$ and $Y^{12}$ may be hydrogen or fluorine; and $n^1$ may be 0.

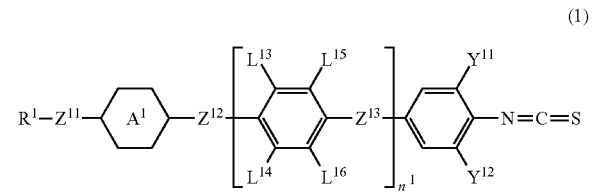

(1)

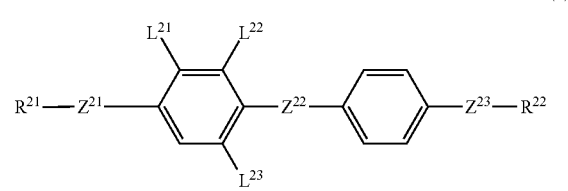

(2)

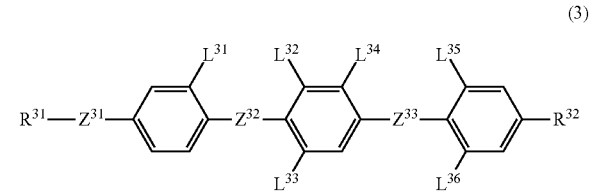

(3)

11 Claims, No Drawings

(56) References Cited

U.S. PATENT DOCUMENTS

| | | | | |
|---|---|---|---|---|
| 2020/0190404 A1* | 6/2020 | Okabe | ................. | C09K 19/542 |
| 2020/0224099 A1* | 7/2020 | Tamura | ................. | C09K 19/12 |
| 2021/0122977 A1* | 4/2021 | Ushakov | ................ | C09K 19/18 |
| 2021/0317369 A1* | 10/2021 | Ding | ................. | C09K 19/3059 |

FOREIGN PATENT DOCUMENTS

| | | | | |
|---|---|---|---|---|
| JP | 2011074074 | | 4/2011 | |
| JP | 2016037607 | | 3/2016 | |
| WO | 2017201515 | | 11/2017 | |
| WO | WO-2020063295 A1 * | 4/2020 | ............. | C09K 19/10 |

\* cited by examiner

LIQUID CRYSTAL COMPOSITION AND ELEMENT USED FOR PHASE CONTROL OF ELECTROMAGNETIC WAVE SIGNAL

CROSS-REFERENCE TO RELATED APPLICATION

This application claims the priority benefit of Japan application serial no. 2020-176832, filed on Oct. 21, 2020. The entirety of the above-mentioned patent application is hereby incorporated by reference herein and made a part of this specification.

BACKGROUND

Technical Field

The disclosure relates to an element used for phase control of an electromagnetic wave signal having a frequency of 1 GHz to 10 THz and a liquid crystal composition used in this element. The liquid crystal composition has a nematic phase and positive dielectric anisotropy.

Related Art

Elements used for the phase control of an electromagnetic wave signal having a frequency of 1 GHz to 10 THz may be a millimeter-wave band or microwave band antenna, an infrared laser element, and the like. Regarding these elements, various methods have been studied, but a method using a liquid crystal composition attracts attention which is considered to have few failures because there is no mechanical movable portion.

The liquid crystal composition having dielectric anisotropy has different dielectric constants in a vertical direction and a horizontal direction with respect to an orientation direction of the liquid crystal composition at a frequency (from several hundred kHz to nearly several hundred MHz or less) lower than a frequency (a relaxation frequency) at which an orientation polarization is relaxed. Even at a frequency higher than the relaxation frequency, the values become smaller, but the difference in the dielectric constants in the vertical direction and the horizontal direction with respect to the orientation direction of the liquid crystal composition is observed, and the difference is almost constant in the range of a microwave to a terahertz wave (to about 10 THz) (Non-patent literature 1).

In the liquid crystal composition, the orientation of a molecule changes according to a bias electric field from outside, and the dielectric constant changes. If this property is utilized, for example, a microwave device which can electrically control a transmission characteristic of a high-frequency transmission line from outside can be realized. Regarding this device, a voltage-controlled millimeter-wave band variable phase shifter in which a nematic liquid crystal composition is filled in a waveguide, a wideband variable phase shifter used for a microwave/millimeter-wave band using a nematic liquid crystal composition to make a dielectric substrate of a microstrip line, and the like are reported (Patent literatures 1 and 2).

This element used for the phase control of an electromagnetic wave signal is desired to have characteristics such as a wide usable temperature range, high gain, low loss, and the like. Therefore, the liquid crystal composition is required to have characteristics such as a high upper limit temperature of the nematic phase, a low lower limit temperature of the nematic phase, low viscosity, large dielectric anisotropy in the frequency region used for the phase control, a small tan δ in the frequency region used for the phase control, and the like.

The liquid crystal composition used in this conventional element is disclosed in Patent literatures 3 to 5 below.

Moreover, because the liquid crystal composition is a dielectric, the polarization occurs. The mechanism by which the polarization occurs is broadly divided into three types, namely an electronic polarization, an ionic polarization, and an orientation polarization. Because the orientation polarization is a polarization associated with the orientation of the liquid crystal molecule, the influence of loss of the dielectric relaxation cannot be ignored, but the noticeable loss disappears as the frequency becomes a high frequency (for example, 1 MHz or higher). As a result, in the high frequency region, there is no change in the dielectric constant due to the loss, and only the electronic polarization and the ionic polarization are involved. Moreover, because the dielectric constant is proportional to a refractive index ($s=n^2$) in a dielectric without loss, it can be said that the dielectric constant and the refractive index measured in the above-described high frequency region are almost unchanged (Non-patent literature 2).

LITERATURE OF RELATED ART

Patent Literature

[Patent literature 1] International Publication No. WO 2017/201515
[Patent literature 2] U.S. Patent Publication No. 2018/0239213
[Patent literature 3] Japanese Patent Laid-Open No. 2004-285085
[Patent literature 4] Japanese Patent Laid-Open No. 2011-74074
[Patent literature 5] Japanese Patent Laid-Open No. 2016-37607

Non-Patent Literature

[Non-patent literature 1] EKISHO, Volume 23 (No. 1), (2019), items 51-55
[Non-patent literature 2] Solid State Physics—Lattice Vibration and Dielectric (by Kentaro Sakudo, published by SHOKABO Co., Ltd.)

SUMMARY

The disclosure provides a liquid crystal composition having good required characteristics described above and an excellent balance of characteristics as a material used in an element for phase control of an electromagnetic wave signal having a frequency of 1 GHz to 10 THz.

As a result of diligent studies, the inventors found that a liquid crystal composition containing a liquid crystal compound having a specific structure solves the above-described problems, and completed the disclosure.

The disclosure has constituents below and other constituents.

Item 1. A liquid crystal composition used for phase control of an electromagnetic wave signal having any frequency from 1 GHz to 10 THz, containing at least one compound selected from a group of compounds represented by Formula (1), at least one compound selected from a group of compounds represented by Formula (2), and at least one compound selected from a group of compounds represented by Formula (3).

(1)

R¹—Z¹¹—(A¹)—Z¹²—[phenyl with L¹³, L¹⁴, L¹⁵, L¹⁶]—Z¹³—[phenyl with Y¹¹, Y¹²]—N=C=S (2)

R²¹—Z²¹—[phenyl with L²¹, L²², L²³]—Z²²—[phenyl]—Z²³—R²²

(3)

R³¹—Z³¹—[phenyl with L³¹, L³³]—Z³²—[phenyl with L³², L³⁴, L³³, L³⁶]—Z³³—[phenyl with L³⁵, L³⁶]—R³²

In Formulas (1) to (3),
R¹, R²¹, R²², R³¹, and R³² are alkyl having 1 to 12 carbon atoms or alkenyl having 2 to 12 carbon atoms, and at least one —CH₂— in the alkyl or the alkenyl may be replaced by —O—;

a ring A¹ is

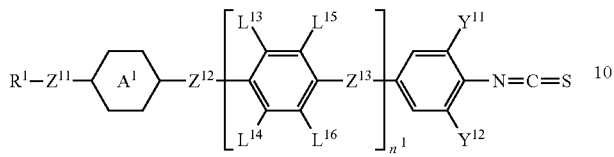

$Z^{11}$, $Z^{21}$, $Z^{23}$, and $Z^{31}$ are single bond, —CH=CH—, or —C≡C—; $Z^{12}$, $Z^{13}$, $Z^{32}$, and $Z^{33}$ are single bond, —C≡C—, or —C≡C—C≡C—, and at least one of $Z^{12}$ and $Z^{13}$ is not a single bond; and $Z^{22}$ is —C≡C— or —C≡C—C≡C—;

$L^{11}$, $L^{12}$, $L^{13}$, $L^{14}$, $L^{15}$, and $L^{16}$ are hydrogen, fluorine, chlorine, methyl, ethyl, or cyclopropyl; $L^{21}$, $L^{22}$, $L^{23}$, $L^{31}$, $L^{32}$, $L^{33}$, $L^{34}$, $L^{35}$, and $L^{36}$ are hydrogen, fluorine, chlorine, methyl, or ethyl;

$Y^{11}$ and $Y^{12}$ are hydrogen, fluorine, or chlorine; and $n^1$ is 0, 1, or 2.

Item 2. The liquid crystal composition according to item 1, containing at least one compound selected from a group of compounds represented by Formulas (1-1) to (1-8).

(1-1)

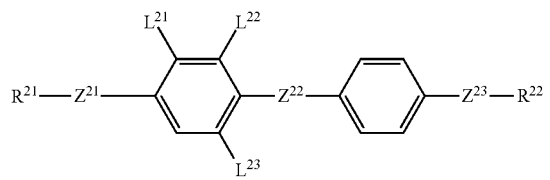

(1-2)

(1-3)

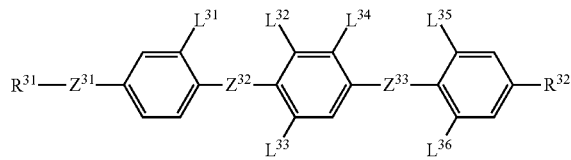

(1-4)

(1-5)

(1-6)

(1-7)

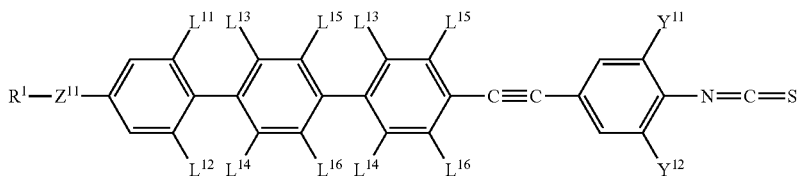
(1-8)

In Formulas (1-1) to (1-8), $R^1$ is alkyl having 1 to 12 carbon atoms or alkenyl having 2 to 12 carbon atoms, and at least one —CH$_2$— in the alkyl or the alkenyl may be replaced by —O—;

$Z^{11}$ is single bond, —CH=CH—, or —C≡C—;

$L^{11}$, $L^{12}$, $L^{13}$, $L^{14}$, $L^{15}$, and $L^{16}$ are hydrogen, fluorine, chlorine, methyl, ethyl, or cyclopropyl; and $Y^{11}$ and $Y^{12}$ are hydrogen, fluorine, or chlorine.

Item 3. The liquid crystal composition according to item 1 or 2, wherein a proportion of the compounds represented by Formula (1) is in a range of 10% by weight to 50% by weight based on a weight of the liquid crystal composition.

Item 4. The liquid crystal composition according to any one of items 1 to 3, containing at least one compound selected from a group of compounds represented by Formulas (2-1) to (2-5).

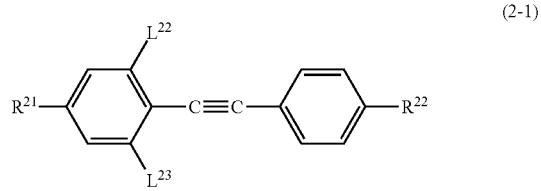
(2-1)

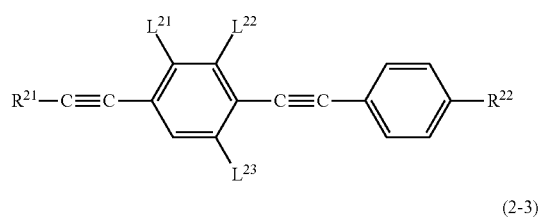
(2-2)

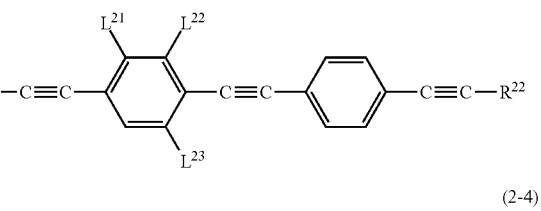
(2-3)

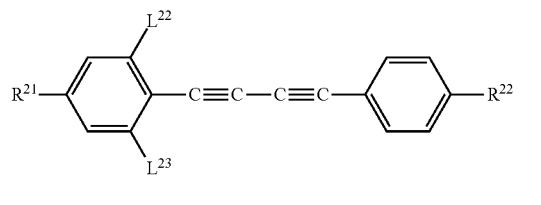
(2-4)

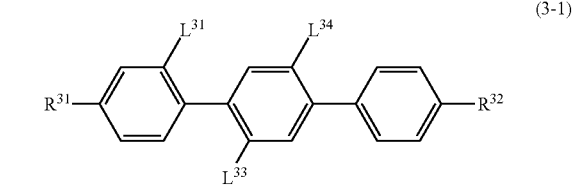
(2-5)

In Formulas (2-1) to (2-5), $R^{21}$ and $R^{22}$ are alkyl having 1 to 12 carbon atoms or alkenyl having 2 to 12 carbon atoms, and at least one —CH$_2$— in the alkyl or the alkenyl may be replaced by —O—; and $L^{21}$, $L^{22}$, and $L^{23}$ are hydrogen, fluorine, chlorine, methyl, or ethyl.

Item 5. The liquid crystal composition according to any one of items 1 to 4, wherein a proportion of the compounds represented by Formula (2) is in a range of 25% by weight to 70% by weight based on a weight of the liquid crystal composition.

Item 6. The liquid crystal composition according to any one of items 1 to 5, containing at least one compound selected from a group of compounds represented by Formulas (3-1) to (3-4).

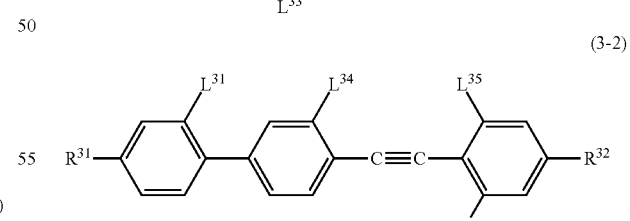
(3-1)

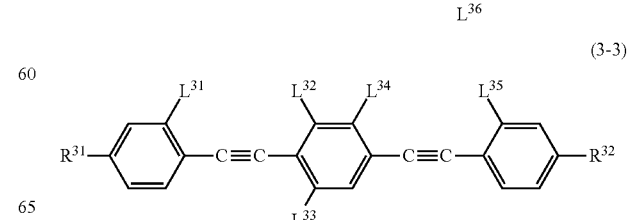
(3-2)

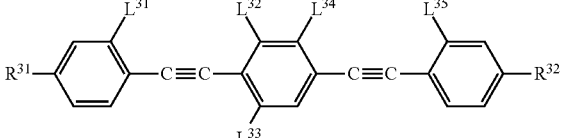
(3-3)

(3-4)

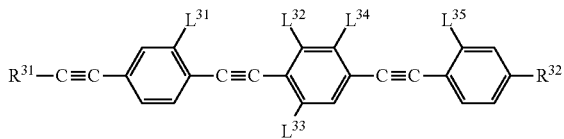

In Formulas (3-1) to (3-4),
$R^{31}$ and $R^{32}$ are alkyl having 1 to 12 carbon atoms or alkenyl having 2 to 12 carbon atoms, and at least one —$CH_2$— in the alkyl or the alkenyl may be replaced by —O—; and
$L^{31}$, $L^{32}$, $L^{33}$, $L^{34}$, $L^{35}$, and $L^{36}$ are hydrogen, fluorine, chlorine, methyl, or ethyl.

Item 7. The liquid crystal composition according to any one of items 1 to 6, wherein a proportion of the compounds represented by Formula (3) is in a range of 10% by weight to 50% by weight based on the weight of the liquid crystal composition.

Item 8. The liquid crystal composition according to any one of items 1 to 7, wherein refractive index anisotropy at 25° C. at a wavelength of 589 nm is in a range of 0.20 to 0.80.

Item 9. The liquid crystal composition according to any one of items 1 to 8, wherein dielectric anisotropy at 25° C. at any frequency from 1 GHz to 10 THz is in a range of 0.40 to 2.0.

Item 10. The liquid crystal composition according to any one of items 1 to 9, containing an optically active compound.

Item 11. The liquid crystal composition according to any one of items 1 to 10, containing a polymerizable compound.

Item 12. An element, which contains the liquid crystal composition according to any one of items 1 to 11, and is used for phase control of an electromagnetic wave signal having any frequency from 1 GHz to 10 THz.

The composition of the disclosure has a high upper limit temperature of the nematic phase, a low lower limit temperature of the nematic phase, low viscosity, large dielectric anisotropy in the frequency region used for the phase control, and a small tan δ in the frequency region used for the phase control.

That is, the liquid crystal composition of the disclosure holds the nematic phase in a wide temperature range, has large dielectric anisotropy and a small tan δ in the frequency region used for the phase control, and has stability.

The element obtained by using the liquid crystal composition of the disclosure has excellent characteristics capable of phase-controlling an electromagnetic wave signal in the wide temperature range.

DESCRIPTION OF THE EMBODIMENTS

The usage of terms in this specification is as follows. Respectively, the term "liquid crystal composition" may be abbreviated as "composition" and the term "liquid crystal element" may be abbreviated as "element". A "liquid crystalline compound" is a general term of compounds that have a liquid crystal phase such as a nematic phase or a smectic phase and compounds that do not have the liquid crystal phase but are mixed into the composition for the purpose of adjusting characteristics such as a temperature range of the nematic phase, viscosity, and dielectric anisotropy. This compound has a six-membered ring such as 1,4-cyclohexylene and 1,4-phenylene, and the molecule (the liquid crystal molecule) of the compound is rod like. A "polymerizable compound" is a compound added for generating a polymer in the composition. In that sense, the liquid crystalline compound having alkenyl is not classified into the polymerizable compound.

The liquid crystal composition is prepared by mixing a plurality of liquid crystalline compounds. A proportion (a content) of the liquid crystalline compound is indicated by a weight percentage (% by weight) based on the weight of the liquid crystal composition. Additives such as an optically active compound, an antioxidant, an ultraviolet absorber, a stabilizer against ultraviolet rays and heat, a quencher, a dye, an antifoaming agent, a polymerizable compound, a polymerization initiator, a polymerization inhibitor, and a magnetic compound are added to the liquid crystal composition as necessary. A proportion (an addition amount) of the additive is indicated by a weight percentage (% by weight) based on the weight of the liquid crystal composition, similarly to the proportion of the liquid crystalline compound. Parts per million by weight (ppm) may also be used. Proportions of the polymerization initiator and the polymerization inhibitor are exceptionally indicated based on the weight of the polymerizable compound.

An "upper limit temperature of a nematic phase" may be abbreviated as an "upper limit temperature". A "lower limit temperature of a nematic phase" may be abbreviated as a "lower limit temperature". The expression "increase the dielectric anisotropy" means that a value of the dielectric anisotropy increases positively when the composition has positive dielectric anisotropy, and means that the value of the dielectric anisotropy increases negatively when the composition has negative dielectric anisotropy.

At least one compound selected from a group of compounds represented by Formula (1) may be abbreviated as a "Compound (1)". The "Compound (1)" means one compound or two or more compounds represented by Formula (1). The same applies to the compounds represented by other formulas as well. "At least one" related to "may be replaced" means that not only the position but also the number thereof may be selected without limitation.

(1z)

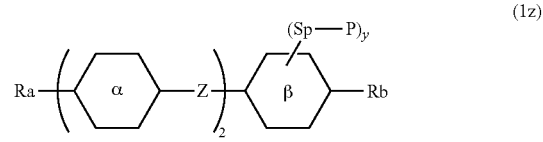

The above Compound (1z) is described as an example. In Formula (1z), symbols α and β enclosed in hexagons respectively correspond to a ring α and a ring β, and represent rings such as a six-membered ring and a condensed ring. When the subscript 'x' is 2, two rings α are present. The two groups represented by the two rings α may be the same or different. This rule is applied to any two rings α when the subscript 'x' is greater than 2. This rule is also applied to other symbols such as a bonding group Z. A diagonal line across one side of the ring β indicates that any hydrogen on the ring β may be replaced by a substituent (-Sp-P). The subscript 'y' indicates the number of the replaced substituents. When the subscript 'y' is 0, the replacement does not occur. When the subscript 'y' is 2 or more, a plurality of substituents (-Sp-P) are present on the ring β. In this case, the rule "may be the same or different" is also applied. Moreover, this rule is also applied to the case in which the Ra symbol is used in a plurality of compounds.

In Formula (1z), for example, the expression such as "Ra and Rb are alkyl, alkoxy, or alkenyl" means that Ra and Rb are independently selected from a group of alkyl, alkoxy, and alkenyl. Here, a group represented by Ra and a group represented by Rb may be the same or different. This rule is also applied to the case in which the Ra symbol is used in a plurality of compounds. This rule is also applied to the case in which a plurality of Ras are used in one compound.

At least one compound selected from compounds represented by Formula (1z) may be abbreviated as "Compound (1z)". The "Compound (1z)" means one compound represented by Formula (1z), a mixture of two compounds, or a mixture of three or more compounds. The same applies to the compounds represented by other formulas as well. The expression "at least one compound selected from compounds represented by Formulas (1z) and (2z)" means at least one compound selected from a group of Compounds (1z) and (2z).

The expression "at least one 'A'" means that the number of 'A' is arbitrary. The expression "at least one 'A' may be replaced by 'B'" means that when the number of 'A' is one, a position of 'A' is arbitrary, and when the number of 'A' is two or more, positions of 'A' can also be selected without limitation. The expression "at least one —CH$_2$— may be replaced by —O—" may be used. In this case, —CH$_2$—CH$_2$—CH$_2$— may be converted to —O—CH$_2$—O— by replacing non-adjacent —CH$_2$— with —O—. However, the adjacent —CH$_2$— is not replaced by —O—, because the replacement results in generation of —O—O—CH$_2$— (peroxide).

The alkyl of the liquid crystalline compound is linear or branched, and does not contain ring-like alkyl unless otherwise specified. The linear alkyl is preferable to the branched alkyl. The same applies to terminal groups such as alkoxy and alkenyl as well. Regarding a stereo configuration related to 1,4-cyclohexylene, trans is preferable to cis to increase the upper limit temperature. 2-fluoro-1,4-phenylene means two divalent groups described below. In the chemical formula, fluorine may be left-facing (L) or right-facing (R). This rule is also applied to divalent groups in asymmetrical rings such as 2,5-difluoro-1,4-phenylene, 2,6-difluoro-1,4-phenylene, pylidine-2,5-diyl, pyrimidine-2,5-diyl, 1,3-dioxane-2,5-diyl, and tetrahydropyran-2,5-diyl. Moreover, preferable tetrahydropyran-2,5-diyl is right-facing (R) to increase the upper limit temperature.

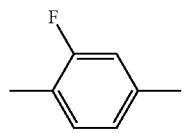 (L)

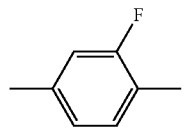 (R)

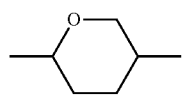 (L)

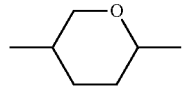 (R)

Similarly, a bonding group such as carbonyloxy may also be —COO— or —OCO—.

In the chemical formulas of component compounds, a symbol of a terminal group $R^1$ is used in a plurality of compounds. In these compounds, the two groups represented by any two $R^1$s may be the same or different. For example, there is a case that $R^1$ of Compound (1-1) is methyl and $R^1$ of Compound (1-2) is ethyl. There is also a case in which $R^1$ of Compound (1-1) is ethyl and $R^1$ of Compound (1-2) is propyl. This rule is also applied to symbols of $R^{21}$, $R^{22}$, $R^{31}$, $R^{32}$, and the like.

The disclosure also includes the following items. (a) The above-described composition further containing at least one additive selected from the additives such as the optically active compound, the antioxidant, the ultraviolet absorber, the stabilizer against ultraviolet rays and heat, the quencher, the dye, the antifoaming agent, the polymerizable compound, the polymerization initiator, the polymerization inhibitor, and the magnetic compound, (b) An element containing the above-described composition, (c) An element which contains the above-described composition, and is used for phase control of an electromagnetic wave signal having any frequency from 1 GHz to 10 THz. (d) The above-described composition further containing a polymerizable compound, and an element containing this composition, (e) Use of the above-described composition as a composition having a nematic phase, (f) Use as an optically active composition by adding the optically active compound to the above-described composition.

The composition of the disclosure is described in the following order. Firstly, a constituent of the component compound in the composition is described. Secondly, main characteristics of the component compound and main effects of this compound on the composition are described. Thirdly, a combination of the components in the composition, a preferable proportion of the components, and the basis thereof are described. Fourthly, a preferable form of the component compound is described. Fifthly, a preferable component compound is shown. Sixthly, the additives that may be added to the composition are described. Seventhly, a synthesis method of the component compound is described. Finally, use of the composition is described.

Firstly, the constituent of the component compound in the composition is described. The composition of the disclosure is classified into a composition A and a composition B. In addition to the liquid crystalline compound selected from Compound (1), Compound (2), and Compound (3), the composition A may further contain other liquid crystalline compounds, additives, and the like. The "other liquid crystalline compounds" are liquid crystalline compounds different from Compound (1), Compound (2), and Compound (3). These compounds are mixed into the composition for the purpose of further adjusting the characteristic. The additives are the optically active compound, the antioxidant, the ultraviolet absorber, the stabilizer against ultraviolet rays and heat, the quencher, the dye, the antifoaming agent, the polymerizable compound, the polymerization initiator, the polymerization inhibitor, the polar compound, and the like.

The composition B substantially contains only the liquid crystalline compound selected from Compound (1), Compound (2), and Compound (3). "Substantially" means that the composition may contain the additives, but does not contain other liquid crystalline compounds. The composition B has a smaller number of the components than the composition A. From the viewpoint of reducing costs, the composition B is preferable to the composition A. From the viewpoint that the characteristic can be further adjusted by mixing other liquid crystalline compounds, the composition A is preferable to the composition B.

Secondly, the main characteristics of the component compound and the main effects of this compound on the characteristic of the composition are described. The main characteristics of the component compound are summarized in Table 1 based on the effect of the disclosure. In symbols of Table 1, L means large or high, M means medium, and S means small or low. The symbols L, M, and S are classifications based on qualitative comparisons between the component compounds, and 0 (zero) means that the value is approximately zero or close to zero.

TABLE 1

| Characteristic of compound | | | |
|---|---|---|---|
| Compound | (1) | (2) | (3) |
| Upper limit temperature | S to L | S to M | M to L |
| Viscosity | M to L | S to M | M to L |
| Refractive index anisotropy | L | L | L |
| Dielectric anisotropy | M to L | 0 | 0 |
| Specific resistance | L | L | L |

When the component compound is mixed into the composition, the main effects of the component compound on the characteristic of the composition are as follows.

Compound (1) mainly has an effect of increasing the refractive index anisotropy and the dielectric anisotropy of the liquid crystal composition. The upper limit temperature and the viscosity can be adjusted according to the number of the rings contained in Compound (1) and the number of $n^1$ in Formula (1). That is, when $n^1$ is 0, the upper limit temperature is reduced and the viscosity is reduced, and when $n^2$ is 2, the viscosity is increased and the upper limit temperature is increased.

Compound (2) mainly has an effect of increasing the refractive index anisotropy of the liquid crystal composition and widening the temperature range of the nematic phase of the liquid crystal composition. Compound (2) has a high ability of reducing the lower limit temperature and the viscosity of the liquid crystal composition.

Compound (3) mainly has an effect of increasing the refractive index anisotropy of the liquid crystal composition and widening the temperature range of the nematic phase of the liquid crystal composition. Compound (3) has a high ability of increasing the upper limit temperature of the liquid crystal composition.

Thirdly, the combination of the components in the composition, the preferable proportion of the component compound, and the basis thereof are described. The combination of the components in the composition is Compound (1)+Compound (2)+Compound (3).

Based on the weight of the liquid crystal composition, a preferable proportion of Compound (1) is about 10% by weight or more to increase the dielectric anisotropy and to increase the refractive index anisotropy, and is about 50% by weight or less to widen the temperature range of the nematic phase and to reduce the viscosity. A further preferable proportion is in a range of about 10% by weight to about 45% by weight. A particularly preferable proportion is in a range of about 10% by weight to about 40% by weight.

Based on the weight of the liquid crystal composition, a preferable proportion of Compound (2) is about 25% by weight or more to increase the refractive index anisotropy and widen the temperature range of the nematic phase, and is about 70% by weight or less to increase the dielectric anisotropy. A further preferable proportion is in a range of about 30% by weight to about 65% by weight. A particularly preferable proportion is in a range of about 35% by weight to about 60% by weight.

Based on the weight of the liquid crystal composition, a preferable proportion of Compound (3) is about 10% by weight or more to increase the refractive index anisotropy and widen the temperature range of the nematic phase, and is about 50% by weight or less to increase the dielectric anisotropy. A further preferable proportion is in a range of about 15% by weight to about 40% by weight. A particularly preferable proportion is in a range of about 15% by weight to about 35% by weight.

Fourthly, the preferable form of the component compound is described. $R^1$, $R^{21}$, $R^{22}$, $R^{31}$, and $R^{32}$ are alkyl having 1 to 12 carbon atoms or alkenyl having 2 to 12 carbon atoms, at least one —$CH_2$— in the alkyl or the alkenyl may be replaced by —O—, and preferable $R^1$, $R^{21}$, $R^{22}$, $R^{31}$, or $R^{32}$ is an alkyl having 1 to 6 carbon atoms to increase the stability against ultraviolet rays or heat.

A preferable alkyl is methyl, ethyl, propyl, butyl, pentyl, hexyl, heptyl, or octyl. A further preferable alkyl is ethyl, propyl, butyl, pentyl, or heptyl to reduce the viscosity.

A preferable alkoxy is methoxy, ethoxy, propoxy, butoxy, pentyloxy, hexyloxy, or heptyloxy. A further preferable alkoxy is methoxy or ethoxy to reduce the viscosity.

A preferable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. A further preferable alkenyl is vinyl, 1-propenyl, 3-butenyl, or 3-pentenyl to reduce the viscosity. A preferable stereo configuration of —CH=CH— in these alkenyls depends on the position of the double bond. For reducing the viscosity and for other purposes, trans is preferable in the alkenyls such as 1-propenyl, 1-butenyl, 1-pentenyl, 1-hexenyl, 3-hexenyl, and 3-hexenyl. Cis is preferable in the alkenyls such as 2-butenyl, 2-pentenyl, and 2-hexenyl. In these alkenyls, the linear alkenyl is preferable to the branched alkenyl.

A preferable alkoxyalkyl is —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$, or —$(CH_2)_5$—$OCH_3$.

$n^1$ is 0, 1, or 2. Preferable $n^1$ is 0 to reduce the viscosity, and is 1 or 2 to increase the upper limit temperature, the dielectric anisotropy, and the refractive index anisotropy.

$Z^{11}$, $Z^{21}$, $Z^{23}$, and $Z^{31}$ are single bond, —CH=CH—, or —C≡C—. Preferable $Z^{11}$, $Z^{21}$, $Z^{23}$, or $Z^{31}$ is single bond to reduce the viscosity and is —C≡C— to increase the refractive index anisotropy. $Z^{12}$, $Z^{13}$, $Z^{32}$, and $Z^{33}$ are single bond, —C≡C—, or —C≡C—C≡C—, but at least one of $Z^{12}$ and $Z^{13}$ is not single bond to increase the refractive index anisotropy. Preferable $Z^{12}$, $Z^{13}$, $Z^{32}$, or $Z^{33}$ is single bond to reduce the viscosity, and is —C≡C— or —C≡C—C≡C— to increase the refractive index anisotropy. $Z^{22}$ is —C≡C— or —C≡C—C≡C—. Preferable $Z^{22}$ is —C≡C—C≡C— to increase the refractive index anisotropy.

A ring $A^1$ is

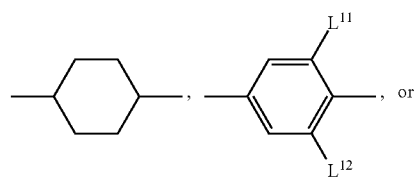

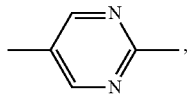

A preferable ring $A^1$ is 1,4-phenylene or 2-fluoro-1,4-phenylene to increase the refractive index anisotropy.

$L^{11}$, $L^{12}$, $L^{13}$, $L^{14}$, $L^{15}$, and $L^{16}$ are hydrogen, fluorine, chlorine, methyl, ethyl, or cyclopropyl. Preferable $L^{11}$, $L^{12}$, $L^{13}$, $L^{14}$, $L^{15}$, or $L^{16}$ are fluorine, ethyl, or cyclopropyl to increase compatibility. $L^{21}$, $L^{22}$, $L^{23}$, $L^{31}$, $L^{32}$, $L^{33}$, $L^{34}$, $L^{35}$, and $L^{36}$ are hydrogen, fluorine, chlorine, methyl, or ethyl. Preferable $L^{21}$, $L^{22}$, $L^{23}$, $L^{31}$, $L^{32}$, $L^{33}$, $L^{34}$, $L^{35}$, or $L^{36}$ are fluorine or ethyl to increase the compatibility. $L^{13}$ and $L^{15}$, $L^{14}$ and $L^{16}$, $L^{21}$ and $L^{22}$, or $L^{33}$ and $L^{35}$ are preferably not fluorine or the like at the same time, because the dielectric anisotropy is negative, and the dielectric anisotropy of the entire liquid crystal composition is reduced.

$Y^{11}$ and $Y^{12}$ are hydrogen, fluorine, or chlorine. Preferable $Y^{11}$ or $Y^{12}$ is fluorine to increase the dielectric anisotropy.

Fifthly, the preferable component compounds are shown. Preferable compounds (1) are Compounds (1-1) to (1-8).

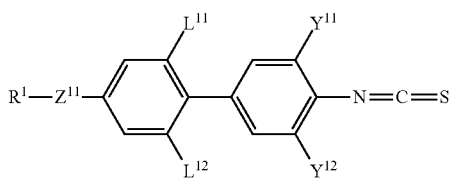
(1-1)

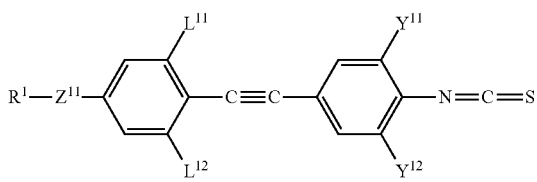
(1-2)

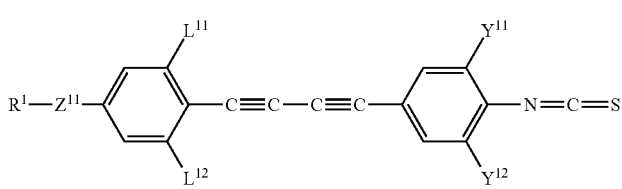
(1-3)

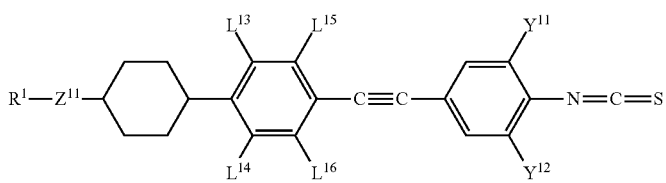
(1-4)

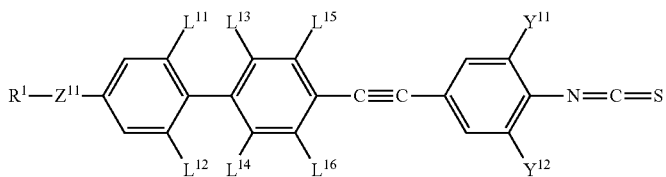
(1-5)

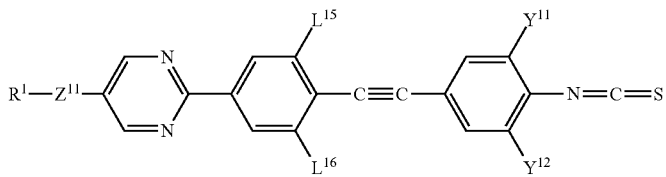
(1-6)

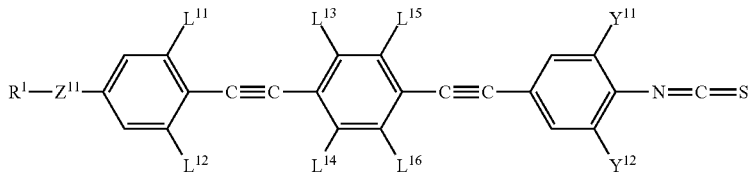
(1-7)

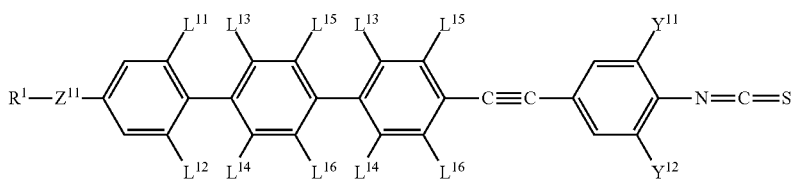
(1-8)

In these formulas, $R^1$ is an alkyl having 1 to 12 carbon atoms or an alkenyl having 2 to 12 carbon atoms, and at least one —CH$_2$— in the alkyl or the alkenyl may be replaced by —O—; $Z^{11}$ is single bond, —CH═CH—, or —C≡C—; $L^{11}$, $L^{12}$, $L^{13}$, $L^{14}$, $L^{15}$, and $L^{16}$ are hydrogen, fluorine, chlorine, methyl, ethyl, or cyclopropyl; and $Y^{11}$ and $Y^{12}$ are hydrogen, fluorine, or chlorine. At least one of Compounds (1) is preferably Compound (1-2), Compound (1-3), Compound (1-5), or Compound (1-7).

Preferable compounds (2) are Compounds (2-1) to (2-5).

(2-1)

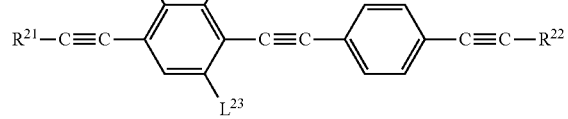

(2-2)

(2-3)

(2-4)

(2-5)

In these formulas, $R^{21}$ and $R^{22}$ are alkyl having 1 to 12 carbon atoms or alkenyls having 2 to 12 carbon atoms, and at least one —CH$_2$— in the alkyl or the alkenyl may be replaced by —O—; and $L^{21}$, $L^{22}$, and $L^{23}$ are hydrogen, fluorine, chlorine, methyl, or ethyl. At least one of the compounds (2) is preferably Compound (2-1), Compound (2-2), or Compound (2-4). At least two of the compounds (2) are preferably combinations of Compound (2-4) with one of Compound (2-1) or Compound (2-2).

Preferable compounds (3) are Compounds (3-1) to (3-4).

(3-1)

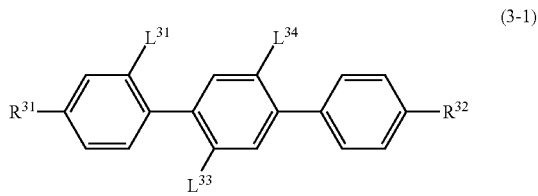

(3-2)

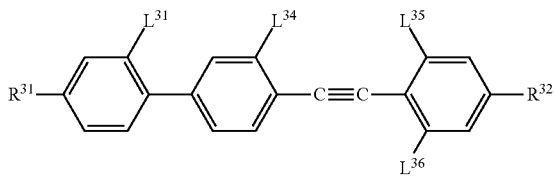

(3-3)

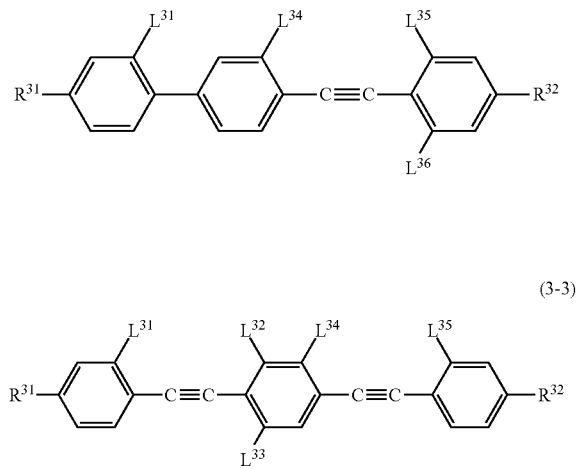

(3-4)

In these formulas, $R^{31}$ and $R^{32}$ are alkyl having 1 to 12 carbon atoms or alkenyl having 2 to 12 carbon atoms, and at least one —CH$_2$— in the alkyl or the alkenyl may be replaced by —O—; and $L^{31}$, $L^{32}$, $L^{33}$, $L^{34}$, $L^{35}$, and $L^{36}$ are hydrogen, fluorine, chlorine, methyl, or ethyl. At least one of the compounds (3) is preferably Compound (3-1), Compound (3-2), or Compound (3-3).

Sixthly, the additives that may be added to the composition are described. These additives are the optically active compound, the antioxidant, the ultraviolet absorber, the stabilizer against ultraviolet rays and heat, the quencher, the dye, the antifoaming agent, the polymerizable compound, the polymerization initiator, the polymerization inhibitor, the polar compound, and the like. In the following, unless otherwise specified, the mixing proportion of these additives is a proportion (a weight) based on the weight of the liquid crystal composition.

For the purpose of inducing a helical structure of the liquid crystal to give a torsion angle, the optically active compound is added to the composition. Examples of this compound are Compounds (5-1) to (5-6). A preferable proportion of the optically active compound is about 5% by weight or less. A further preferable proportion is in a range of about 0.01% by weight to about 2% by weight.

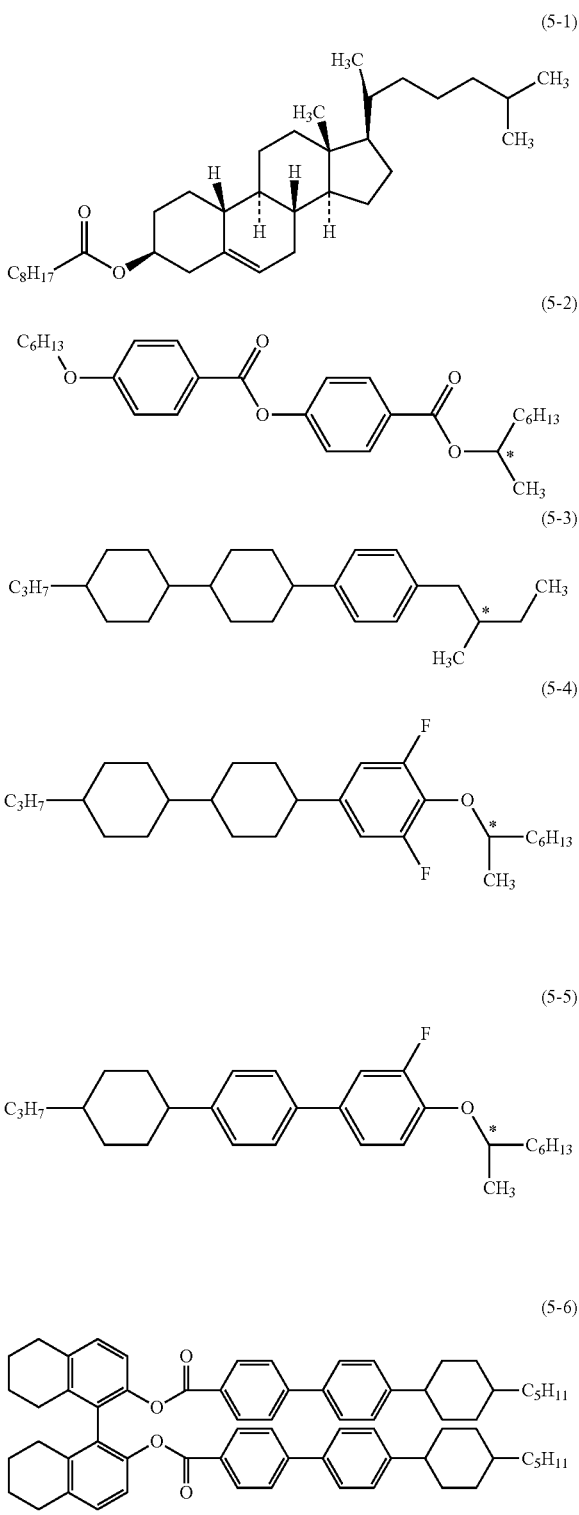

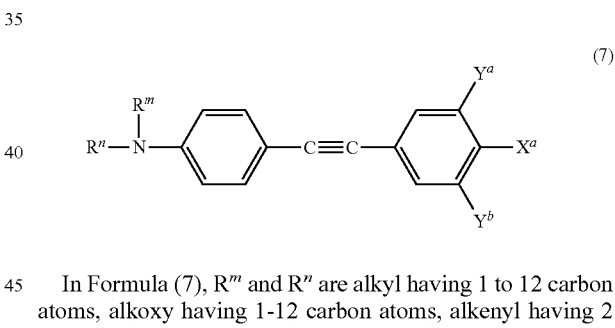

In Compound (6), preferable t is 1, 3, 5, 7, or 9. Further preferable t is 7. Compound (6) in which t is 7 has low volatility, and thus it is effective to maintain a large voltage retention not only at a room temperature but also at a temperature close to the upper limit temperature after the element is used for a long time. A preferable proportion of the antioxidant is about 50 ppm or more to obtain the effect, and is about 600 ppm or less so as not to reduce the upper limit temperature or increase the lower limit temperature. A further preferable proportion is in a range of about 100 ppm to about 300 ppm.

Preferable examples of the ultraviolet absorber are a benzophenone derivative, a benzoate derivative, a triazole derivative, and the like. A light stabilizer such as amine having a stereo hindrance is also preferable. A preferable proportion of these absorbers and stabilizers is about 50 ppm or more to obtain the effect, and is about 10000 ppm or less so as not to reduce the upper limit temperature or increase the lower limit temperature. A further preferable proportion is in a range from about 100 ppm to about 10000 ppm.

A preferable example of the stabilizer against ultraviolet rays and heat is an amino-tran compound shown in Compound (7), or the like (U.S. Pat. No. 6,495,066).

In order to prevent the reduction of the specific resistance due to heating in the atmosphere or to maintain a large voltage retention not only at a room temperature but also at a temperature close to the upper limit temperature after the element is used for a long time, the antioxidant is added to the composition. A preferable example of the antioxidant is Compound (6), in which t is an integer of 1 to 9, or the like.

In Formula (7), $R^m$ and $R^n$ are alkyl having 1 to 12 carbon atoms, alkoxy having 1-12 carbon atoms, alkenyl having 2 to 12 carbon atoms, or alkenyloxy having 2 to 12 carbon atoms; $X^a$ is $-NO_2$, $-C\equiv N$, $-N=C=S$, fluorine, or $-OCF_3$; and $Y^a$ and $Y^b$ are hydrogen or fluorine. In order to obtain the effect, a preferable proportion of these stabilizers is in a range of 1-20% by weight, and preferably in a range of 5-10% by weight.

The quencher is a compound which prevents decomposition of the liquid crystalline compound by receiving light energy absorbed by the liquid crystalline compound and converting the light energy into heat energy. A preferable proportion of these quenchers is about 50 ppm or more to obtain the effect, and is about 20000 ppm or less to reduce the lower limit temperature. A further preferable proportion is in a range of about 100 ppm to about 10000 ppm.

A dichroic dye such as an azo-based dye, an anthraquinone-based dye, or the like is added to the composition to make the composition match the element in a guest host (GH) mode. A preferable proportion of the dye is in a range of about 0.01% by weight to about 10% by weight. In order to prevent foaming, the antifoaming agent such as dimethyl silicone oil, methyl phenyl silicone oil, or the like is added to the composition. A preferable proportion of the antifoaming agent is about 1 ppm or more to obtain the effect, and is about 1000 ppm or less to prevent a display defect. A further preferable proportion is in a range of about 1 ppm to about 500 ppm.

The polymerizable compound is added to the composition in order to make the composition match the polymer-stabilized element. Preferable examples of the polymerizable compound are compounds having a polymerizable group, such as acrylate, methacrylate, a vinyl compound, a vinyloxy compound, propenyl ether, an epoxy compound (oxirane and oxetane), vinyl ketone, and the like. A further preferable example is a derivative of acrylate or methacrylate. A preferable proportion of the polymerizable compound is about 0.05% by weight or more to obtain the effect, and is about 20% by weight or less to prevent the increase of the drive temperature. A further preferable proportion is in a range of about 0.1% by weight to about 10% by weight. The polymerizable compound is polymerized by the ultraviolet ray irradiation. The polymerizable compound may be polymerized in the presence of an initiator such as a photopolymerization initiator or the like. An appropriate condition for polymerization, an appropriate type of the initiator, and the appropriate amount are known to the person skilled in the art, and are described in the literature. For example, Irgacure 651 (registered trademark; BASF), Irgacure 184 (registered trademark; BASF), or Darocure 1173 (registered trademark; BASF), which is a photopolymerization initiator, is appropriate to radical polymerization. A preferable proportion of the photopolymerization initiator is in a range of about 0.1 parts by weight to about parts by weight based on 100 parts by weight of the weight of the polymerizable compound. A further preferable proportion is in a range of about 1 part by weight to about 3 parts by weight.

When the polymerizable compound is stored, the polymerization inhibitor may be added to prevent the polymerization. The polymerizable compound is usually added to the composition without removing the polymerization inhibitor. Examples of the polymerization inhibitor are hydroquinone, a hydroquinone derivative such as methylhydroquinone, 4-tert-butylcatechol, 4-methoxyphenol, phenothiazine, and the like.

The polar compound is an organic compound having a polarity. Here, a compound having an ionic bond is not contained. Atoms such as oxygen, sulfur, and monoxide are more electrically negative and tend to have partial negative charges. Carbon and hydrogen are neutral or tend to have partial positive charges. The polarity arises because the partial charges are not evenly distributed between atoms of different species in the compound. For example, the polar compound has at least one of partial structures such as —OH, —COOH, —SH, —NH$_2$, >NH, and >N—.

Seventhly, the synthesis method of the component compound is described. These compounds can be synthesized by the method described in books such as Organic Syntheses (John Wiley & Sons, Inc.), Organic Reactions (John Wiley & Sons, Inc.), Comprehensive Organic Synthesis (Pergamon Press), New Experimental Chemistry Course (Maruzen), and the like. The composition is prepared from the compound obtained in this way by a known method. For example, the component compounds are mixed and then mutually dissolved by heating.

Finally, the use of the composition is described. The composition of the disclosure mainly has a lower limit temperature of about −10° C. or less, an upper limit temperature of about 70° C. or more, and refractive index anisotropy in a range of about 0.20 to about 0.80. By controlling the proportion of the component compound or by mixing other liquid crystalline compounds, a composition having refractive index anisotropy in a range of about 0.30 to about 0.60, furthermore, a composition having refractive index anisotropy in a range of about 0.40 to about 0.55 may be prepared. This composition can be used as a composition having a nematic phase, and can be used as an optically active composition by adding the optically active compound.

This composition can be used in the element used for the phase control of an electromagnetic wave signal having a frequency of 1 GHz to 10 THz. Application examples include, for example, a millimeter-wave band variable phase shifter, a light detection and ranging (LiDAR) element, and the like.

The dielectric anisotropy of the composition is desired to be large in order to reduce the drive voltage of the element. The dielectric anisotropy is preferably in a range of 1 to 50, and further preferably in a range of 1 to 30.

Example

The disclosure is described in more detail by examples. The disclosure is not limited by these examples. The disclosure also includes a mixture obtained by mixing at least two of the compositions of the examples. Characteristics of the compositions are measured by methods described below.

Measurement method: The characteristics are measured by the following methods. Many of these methods are methods described in JEITA standard (JEITAED-2521B) which are deliberated and enacted by Japan Electronics and Information Technology Industries Association (hereinafter referred to as JEITA), or methods obtained by modifying the above-described methods. A thin film transistor (TFT) is not attached to a TN element used for the measurement.

Upper Limit Temperature of Nematic Phase (NI; ° C.):

A sample is placed on a hot plate of a melting point measurement device equipped with a polarizing microscope, and is heated at a rate of 1° C./min. The temperature when a part of the sample is changed from the nematic phase to an isotropic liquid is measured.

Lower Limit Temperature of Nematic Phase (Tc; ° C.):

A sample having a nematic phase is put into a glass bottle and stored in a freezer at 0° C., −10° C., −20° C., −30° C., and −40° C. for 10 days, and then the liquid crystal phase is observed. For example, when the sample is remained in the nematic phase at −20° C. and is changed to a crystal or a smectic phase at −30° C., Tc is described as <−20° C.

Viscosity (Bulk Viscosity; η; Measured at 20° C.; mPa·s):

An E-type rotation viscometer manufactured by Tokyo Keiki Inc. is used for the measurement.

Viscosity (Rotation Viscosity; γ1; Measured at 25° C.; mPa·s):

The measurement is performed according to a method described in M. Imai et ah, Molecular Crystals and Liquid Crystals, Vol. 259, 37 (1995). A sample is put into the TN element having a twist angle of 0° and an internal (a cell gap) of 5 μm between two glass substrates. A voltage is applied to this element in 0.5 V increments each time in a stepwise manner in a range of 16 V to 19.5 V. After no application for 0.2 seconds, the application is repeated under the condition of only one square wave (a square pulse; 0.2 seconds) and no application (2 seconds). A peak current and a peak time of a transient current generated by this application are measured. The value of the rotation viscosity is obtained from these measurement values and Calculation formula (8) described on page 40 in the paper of M. Imai et al. The value of the dielectric anisotropy required for this calculation is obtained by a method described below using the element measuring this rotation viscosity.

Refractive Index Anisotropy (Δn; Measured at 25° C.):

The measurement is performed using light having a wavelength of 589 nm by an Abbe refractometer in which a polarizing plate is attached to an eyepiece. After a surface of a main prism is rubbed in one direction, a sample is dropped onto the main prism. A refractive index $n_{//}$ is measured when the polarization direction is parallel to the rubbing direction. A refractive index $n_{\perp}$ is measured when the polarization direction is perpendicular to the rubbing direction. The value of the refractive index anisotropy is calculated from Formula $\Delta n = n_{//} - n_{\perp}$.

Dielectric Anisotropy (Δε; Measured at 25° C.):

A sample is put into the TN element having an internal (a cell gap) of 9 μm between two glass substrates and a twist angle of 80 degrees. A sine wave (10 V, 1 kHz) is applied to this element, and after 2 seconds, a dielectric constant ($\varepsilon_{//}$) of the liquid crystal molecule in a long axis direction is measured. A sine wave (0.5 V, 1 kHz) is applied to this element, and after 2 seconds, a dielectric constant ($\varepsilon_{\perp}$) of the liquid crystal molecule in a short axis direction is measured. The value of the dielectric anisotropy is calculated from Formula $\Delta\varepsilon = \varepsilon_{//} - \varepsilon_{\perp}$.

Threshold Value Voltage (Vth; Measured at 25° C.; V):

A LCD 5100 type luminance meter manufactured by Otsuka Electronics Co., Ltd. is used for the measurement. The light source is a halogen lamp. A sample is put into a normally white mode TN element having an internal (a cell gap) of 0.45/Δn (μm) between two glass substrates and a twist angle of 80 degrees. A voltage (32 Hz, a square wave) applied to this element is increased by 0.02 V each time in a stepwise manner from 0 V to 10 V. At this time, the light is irradiated from a vertical direction to the element, and the amount of the light transmitting through the element is measured. A voltage-transmittance curve is created in which the transmittance is 100% when the light amount is maximum and the transmittance is 0% when the light amount is minimum. The threshold value voltage is shown by the voltage when the transmittance is 90%.

Specific Resistance (ρ; Measured at 25° C.; Ω cm):

A sample of 1.0 mL is injected into a container equipped with an electrode. A DC voltage (10 V) is applied to this container, and a DC current after 10 seconds is measured. The specific resistance is calculated from the following formula. (Specific resistance)={(voltage)×(electrical capacity of container)}/{(DC current)×(vacuum dielectric constant)}.

Dielectric Anisotropy at 28 GHz (Measured at Room Temperature):

Regarding the dielectric anisotropy at 28 GHz (Δε @ 28 GHz), by a method disclosed in Applied Optics, Vol. 44, No. 7, p 1150 (2005), a liquid crystal is filled in a V-band variable short-circuit waveguide to which a window material is attached, and the liquid crystal is held in a static magnetic field of 0.3 T for three minutes. A microwave of 28 GHz is input to the waveguide, and an amplitude ratio of the reflected wave with respect to the incident wave is measured. A direction of the static magnetic field and a tube length of a short circuit apparatus are changed and measured, and the refractive index (n:$n_e$, $n_o$) and a loss parameter (α:$\alpha_e$, $\alpha_o$) are determined.

The refractive index and the loss parameter calculated in the previous section and the following relation equations are used for the calculation of the complex dielectric constant.

$$\varepsilon' = n^2 - \kappa^2$$

$$\varepsilon'' = 2n\kappa$$

$$\alpha = 2\omega\kappa/c$$

Here, c is the speed of light in a vacuum, $\varepsilon'_{//}$ is calculated from $n_e$, $\varepsilon'_{\perp}$ is calculated from $n_o$, and the dielectric anisotropy (Δε @ 28 GHz) is calculated from $\varepsilon'_{//} - \varepsilon'_{\perp}$.

Tan δ at 28 GHz (Measured at Room Temperature):

Tan δ at 28 GHz is calculated using the complex dielectric constant (ε', ε'') in a form of tan δ=ε''/ε'. Because anisotropy is also exhibited in tan δ, tan δ at 28 GHz having a larger value is recorded.

The compounds in the examples are represented by the symbols based on the definition in Table 2. The number in parentheses after the symbol corresponds to the compound number. The symbol (-) means other liquid crystalline compounds. The proportion (percentage) of the liquid crystalline compound is a weight percentage (% by weight) based on the weight of the liquid crystal composition. Finally, the characteristic values of the composition are summarized.

TABLE 2

| Notation method of compounds using symbols R—(A$_1$)—Z$_1$—. . .—Z$_n$—(A$_n$)—R' | |
|---|---|
| 1) Left terminal group R— | Symbol |
| C$_n$H$_{2n+1}$— | n— |
| C$_n$H$_{2n+1}$O— | nO— |
| C$_n$H$_{2n+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$ | Vn— |
| C$_m$H$_{2m+1}$—CH=CH—C$_n$H$_{2n}$— | mVn— |
| C$_n$H$_{2n+1}$—C≡C— | nT— |
| 2) Right terminal group —R' | Symbol |
| —C$_n$H$_{2n+1}$ | —n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —C$_n$H$_{2n}$—CH=CH—C$_m$H$_{2m+1}$ | —nVm |
| —C≡C—C$_n$H$_{2n+1}$ | —Tn |
| —F | —F |
| —Cl | —CL |
| —OCF$_3$ | —OCF3 |
| —CF$_3$ | —CF3 |
| —C≡N | —C |
| —C≡C—C≡N | —TC |
| —N=C=S | —NCS |
| 3) Bonding group —Zn— | Symbol |
| —C$_2$H$_4$— | 2 |
| —COO— | E |
| —CH=CH— | V |
| —C≡C— | T |
| —C≡C—C≡C— | TT |
| —CF$_2$O— | X |
| 4) Ring structure —An— | Symbol |
| 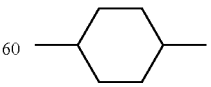 | H |
| 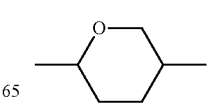 | Dh |

TABLE 2-continued

| Notation method of compounds using symbols R—(A₁)—Z₁—...—Zₙ—(Aₙ)—R' | |
|---|---|
| (tetrahydropyran ring) | dh |
| (benzene ring) | B |
| (dioxane ring) | G |
| (pyrimidine ring) | Py |
| (fluorobenzene) | B(F) |
| (ethylbenzene) | B(Et) |
| (2-fluorobenzene) | B(2F) |
| (difluorobenzene) | B(F, F) |
| (2,5-difluorobenzene) | B(2F, 5F) |

5) Notation example
Example 1 5-BTB(F)-NCS

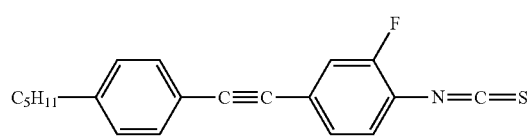

Example 2 5T-BTB-2

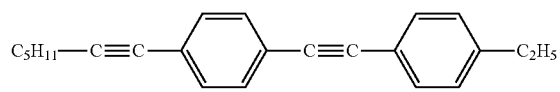

TABLE 2-continued

Notation method of compounds using symbols
R—(A₁)—Z₁—...—Zₙ—(Aₙ)—R'

Example 3 5-BTB(F)TB-2

$C_5H_{11}$—⌬—C≡C—⌬(F)—C≡C—⌬—$C_2H_5$

[Comparative Example 1] Liquid Crystal Composition C1

| | | |
|---|---|---|
| 2-BTB-O1 | (2-1) | 6.8% |
| 3-BTB-O1 | (2-1) | 6.8% |
| 4-BTB-O1 | (2-1) | 6.8% |
| 4-BTB-O2 | (2-1) | 6.8% |
| 5-BTB-O1 | (2-1) | 6.8% |
| 2-BB(F)B-5 | (3-1) | 6% |
| 3-BB(F)B-5 | (3-1) | 2% |
| 3-BB(F)TB-4 | (3-2) | 24% |
| 3-H2BTB-4 | (—) | 6% |
| 3-HB(F)TB-4 | (—) | 9% |
| 3-BB(F,F)XB(F,F)-F | (—) | 9% |
| 3-BB(F,F)XB(F)B(F,F)-F | (—) | 10% |

NI = 104.0° C.;
Tc < −30° C.;
Δn = 0.280;
Δε = 4.2.

The dielectric anisotropy and the tan δ of the liquid crystal composition C1 at 28 GHz are as follows.

Δε @ 28 GHz=0.65 tan δ @ 28 GHz=0.014

[Example 1] Liquid Crystal Composition 1

| | | |
|---|---|---|
| 4-BTB(F)-NCS | (1-2) | 10% |
| 5-BTB(F)-NCS | (1-2) | 10% |
| 2-BTB-O1 | (2-1) | 2.4% |
| 3-BTB-O1 | (2-1) | 2.4% |
| 4-BTB-O1 | (2-1) | 2.4% |
| 4-BTB-O2 | (2-1) | 2.4% |
| 5-BTB-O1 | (2-1) | 2.4% |
| 3-BTTB-4 | (2-4) | 5% |
| 3-BTTB-5 | (2-4) | 5% |
| 3-BTTB-O1 | (2-4) | 10% |
| 5-BTTB-O1 | (2-4) | 10% |
| 3-BB(F)TB-4 | (3-2) | 20% |
| 2-BTB(F)TB-5 | (3-3) | 8% |
| 3-BB(F,F)XB(F)B(F,F)-F | (—) | 10% |

NI = 125.3° C.;
Tc < −20° C.;
Δn = 0.379;
Δε = 5.0.

The dielectric anisotropy and the tan δ of the liquid crystal composition 1 at 28 GHz are as follows.

Δε @28 GHz=0.87 tan δ @ 28 GHz=0.015

[Example 2] Liquid Crystal Composition 2

| | | |
|---|---|---|
| 5-B(Et)TB(F,F)-NCS | (1-2) | 13% |
| 2-BTB-O1 | (2-1) | 3.8% |
| 3-BTB-O1 | (2-1) | 3.8% |
| 4-BTB-O1 | (2-1) | 3.8% |
| 4-BTB-O2 | (2-1) | 3.8% |
| 5-BTB-O1 | (2-1) | 3.8% |
| 3-BTTB-4 | (2-4) | 5% |
| 3-BTTB-5 | (2-4) | 5% |
| 3-BTTB-O1 | (2-4) | 10% |
| 5-BTTB-O1 | (2-4) | 10% |
| 3-BB(F)TB-4 | (3-2) | 16% |
| 2-BTB(F)TB-5 | (3-3) | 8% |
| 5-BTB(F)TB-2 | (3-3) | 4% |
| 3-BB(F,F)XB(F)B(F,F)-F | (—) | 10% |

NI = 122.0° C.;
Tc < −20° C.;
Δn = 0.383;
Δε = 5.0.

The dielectric anisotropy and the tan δ of the liquid crystal composition 2 at 28 GHz are as follows.

Δε @ 28 GHz=0.89 tan δ @ 28 GHz=0.014

[Example 3] Liquid Crystal Composition 3

| | | |
|---|---|---|
| 4-BTB(F)-NCS | (1-2) | 10% |
| 5-BTB(F)-NCS | (1-2) | 10% |
| 5-BBTB(F)-NCS | (1-5) | 10% |
| 2-BTB-O1 | (2-1) | 3.2% |
| 3-BTB-O1 | (2-1) | 3.2% |
| 4-BTB-O1 | (2-1) | 3.2% |
| 4-BTB-O2 | (2-1) | 3.2% |
| 5-BTB-O1 | (2-1) | 3.2% |
| 3-BTTB-4 | (2-4) | 5% |
| 3-BTTB-5 | (2-4) | 5% |
| 3-BTTB-O1 | (2-4) | 10% |
| 5-BTTB-O1 | (2-4) | 10% |
| 3-BB(F)TB-4 | (3-2) | 16% |
| 2-BTB(F)TB-5 | (3-3) | 8% |

NI = 127.5° C.;
Tc < −20° C.;
Δn = 0.426;
Δε = 4.2.

The dielectric anisotropy and the tan δ of the liquid crystal composition 3 at 28 GHz are as follows.

Δε @ 28 GHz=0.96 tan δ @ 28 GHz=0.016

[Example 4] Liquid Crystal Composition 4

| | | |
|---|---|---|
| 5-BTB(F)-NCS | (1-2) | 10% |
| 5-BTTB(F)-NCS | (1-3) | 10% |
| 2-BTB-O1 | (2-1) | 4.6% |
| 3-BTB-O1 | (2-1) | 4.6% |
| 4-BTB-O1 | (2-1) | 4.6% |
| 4-BTB-O2 | (2-1) | 4.6% |
| 5-BTB-O1 | (2-1) | 4.6% |
| 3-BTTB-4 | (2-4) | 5% |
| 3-BTTB-5 | (2-4) | 5% |
| 3-BTTB-O1 | (2-4) | 10% |
| 5-BTTB-O1 | (2-4) | 10% |
| 3-BB(F)TB-4 | (3-2) | 14% |
| 2-BTB(F)TB-5 | (3-3) | 8% |
| 5-BTTB(F,F)-C | (—) | 5% |

NI = 119.5° C.;
Tc < −20° C.;
Δn = 0.403;
Δε = 4.3.

The dielectric anisotropy and the tan δ of the liquid crystal composition 4 at 28 GHz are as follows.

Δε @ 28 GHz=0.93 tan δ @ 28 GHz=0.016

The liquid crystal composition can be prepared in which tan δ at 28 GHz is small to the same extent and Δε is extremely large compared with the comparative examples.

INDUSTRIAL APPLICABILITY

The liquid crystal composition of the disclosure has a high upper limit temperature of the nematic phase, a low lower limit temperature of the nematic phase, low viscosity, large dielectric anisotropy in the frequency region used for the phase control, and a small tan δ in the frequency region used for the phase control. The element containing this composition can be used for the phase control of an electromagnetic wave signal having a frequency of 1 GHz to 10 THz in a wide temperature range.

What is claimed is:

1. A liquid crystal composition used for phase control of an electromagnetic wave signal of any frequency from 1 GHz to 10 THz, containing at least one compound represented by Formula (1), at least one compound represented by Formula (2), and at least one compound represented by Formula (3), wherein a dielectric anisotropy of the liquid crystal composition at 25° C. at any frequency from 1 GHz to 10 THz is in a range of 0.40 to 2.0, and wherein

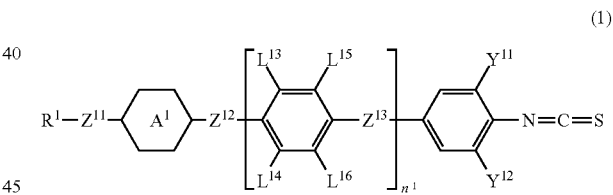

(1)

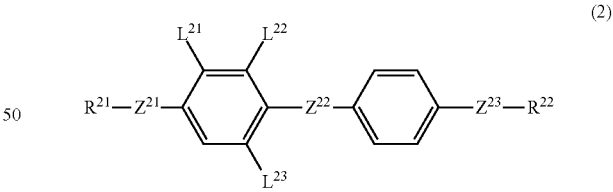

(2)

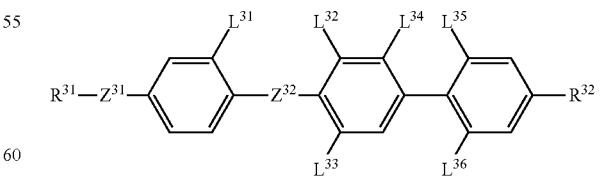

(3)

in Formulas (1) to (3), $R^1$, $R^{21}$, $R^{22}$, $R^{31}$, and $R^{32}$ are alkyl having 1 to 12 carbon atoms or alkenyl having 2 to 12 carbon atoms, and at least one —CH$_2$— in the alkyl or the alkenyl may be replaced by —O—;

a ring A¹ is

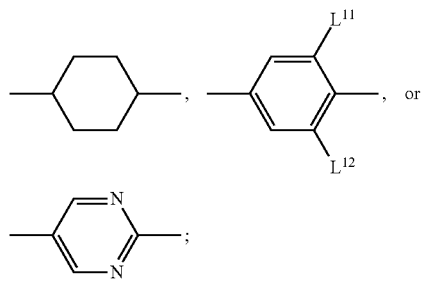

n¹ is 0, 1, or 2;

Z¹¹, Z²¹, Z²³, and Z³¹ are single bond, —CH=CH—, or —C≡C—;

Z¹² and Z¹³ are single bond or —C≡C—, when n¹ is 0, Z¹² is —C≡C—, and when n¹ is 1 or 2, at least one of Z¹² and Z¹³ is not a single bond;

Z³² and Z³³ are single bond, —C≡C— or —C≡C—C≡C—;

and Z²² is —C≡C— or —C≡C—C≡C—;

L¹¹, L¹², L¹³, L¹⁴, L¹⁵, and L¹⁶ are hydrogen, fluorine, chlorine, methyl, ethyl, or cyclopropyl; L²¹, L²², L²³, L³¹, L³², L³³, L³⁴, L³⁵, and L³⁶ are hydrogen, fluorine, chlorine, methyl, or ethyl; and Y¹¹ and Y¹² are hydrogen, fluorine, or chlorine.

2. The liquid crystal composition according to claim 1, containing at least one compound selected from a group of compounds represented by Formulas (1-2) and (1-4) to (1-8), wherein

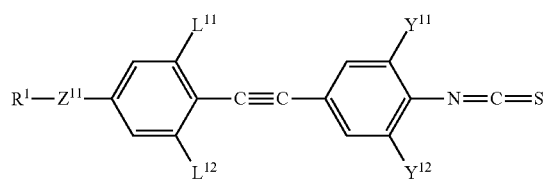
(1-2)

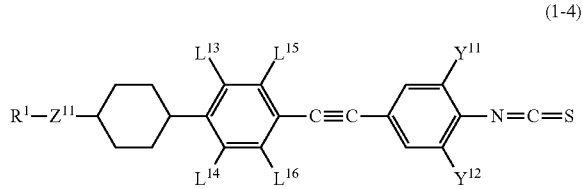
(1-4)

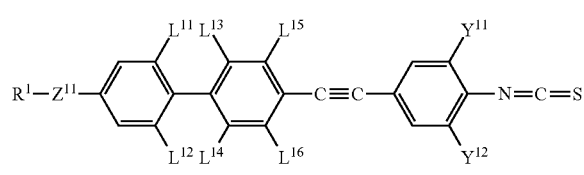
(1-5)

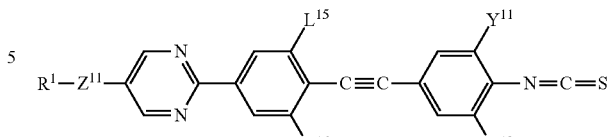
(1-6)

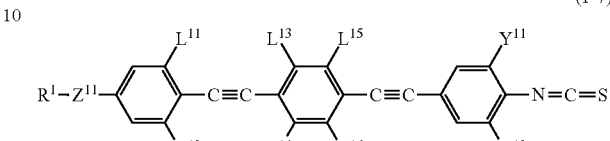
(1-7)

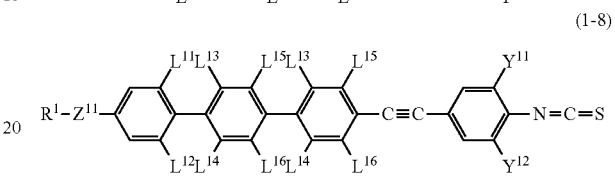
(1-8)

in Formulas (1-2) and (1-4) to (1-8),

R¹ is alkyl having 1 to 12 carbon atoms or alkenyl having 2 to 12 carbon atoms, and at least one —CH₂— in the alkyl or the alkenyl may be replaced by —O—;

Z¹¹ is single bond, —CH=CH— or —C≡C—; and

Y¹¹ and Y¹² are hydrogen, fluorine, or chlorine; and in Formulas (1-2), (1-5), (1-7) and (1-8), L¹¹ and L¹² are hydrogen, fluorine, chlorine, methyl, ethyl, or cyclopropyl;

in Formulas (1-4), (1-5), (1-7) and (1-8), L¹³ and L¹⁴ are hydrogen, fluorine, chlorine, methyl, ethyl, or cyclopropyl; and in Formulas (1-4) to (1-8), L¹⁵ and L¹⁶ are hydrogen, fluorine, chlorine, methyl, ethyl, or cyclopropyl.

3. The liquid crystal composition according to claim 1, wherein a proportion of the at least one compound represented by Formula (1) is in a range of 10% by weight to 50% by weight based on a weight of the liquid crystal composition.

4. The liquid crystal composition according to claim 1, containing at least one compound selected from a group of compounds represented by Formulas (2-1) to (2-5), wherein

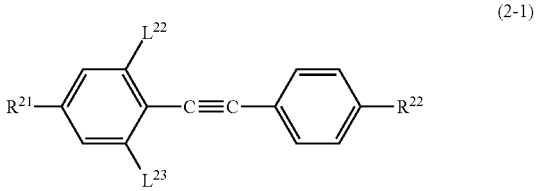
(2-1)

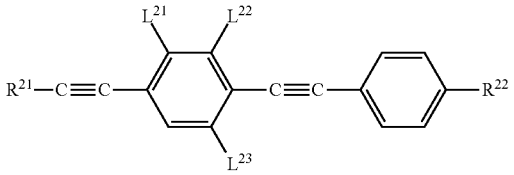
(2-2)

(2-3)

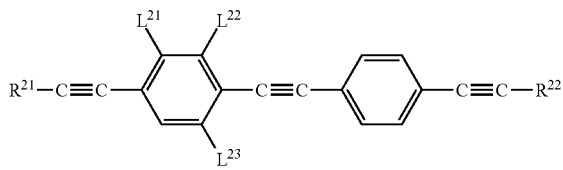

(2-4)

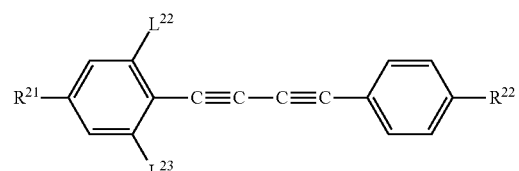

(2-5)

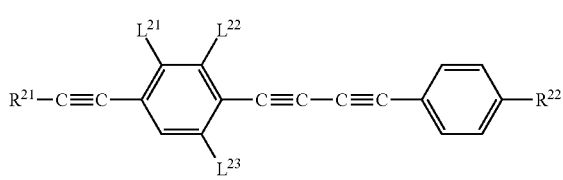

in Formulas (2-1) to (2-5),
$R^{21}$ and $R^{22}$ are alkyl having 1 to 12 carbon atoms or alkenyl having 2 to 12 carbon atoms, and at least one —CH$_2$— in the alkyl or the alkenyl may be replaced by —O—; and
$L^{21}$, $L^{22}$, and $L^{23}$ are hydrogen, fluorine, chlorine, methyl, or ethyl.

5. The liquid crystal composition according to claim 1, wherein a proportion of the at least one compound represented by Formula (2) is in a range of 25% by weight to 70% by weight based on a weight of the liquid crystal composition.

6. The liquid crystal composition according to claim 1, containing at least one compound selected from a group of compounds represented by Formulas (3-1) to (3-4), wherein (3-1)

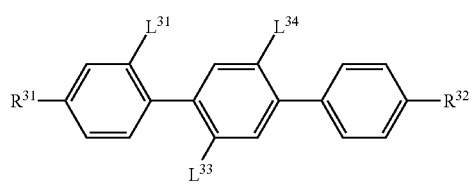

(3-2)

(3-3)

(3-4)

in Formulas (3-1) to (3-4),
$R^{31}$ and $R^{32}$ are alkyl having 1 to 12 carbon atoms or alkenyl having 2 to 12 carbon atoms, and at least one —CH$_2$— in the alkyl or the alkenyl may be replaced by —O—; and
$L^{31}$, $L^{32}$, $L^{33}$, $L^{34}$, $L^{35}$, and $L^{36}$ are hydrogen, fluorine, chlorine, methyl, or ethyl.

7. The liquid crystal composition according to claim 1, wherein a proportion of the at least one compound represented by Formula (3) is in a range of 10% by weight to 50% by weight based on the weight of the liquid crystal composition.

8. The liquid crystal composition according to claim 1, wherein refractive index anisotropy at 25° C. at a wavelength of 589 nm is in a range of 0.20 to 0.80.

9. The liquid crystal composition according to claim 1, containing an optically active compound.

10. The liquid crystal composition according to claim 1, containing a polymerizable compound.

11. An element, which contains the liquid crystal composition according to claim 1, and is used for phase control of an electromagnetic wave signal having any frequency from 1 GHz to 10 THz.

\* \* \* \* \*